June 17, 1958 — C. U. GRAMELSPACHER — 2,839,118
COMBINATION TUBELESS AND SAFETY TUBELESS TIRE
Filed Dec. 20, 1952 — 2 Sheets-Sheet 1

*INVENTOR.*
CLARENCE U. GRAMELSPACHER
BY
ATTORNEYS

June 17, 1958   C. U. GRAMELSPACHER   2,839,118
COMBINATION TUBELESS AND SAFETY TUBELESS TIRE
Filed Dec. 20, 1952   2 Sheets-Sheet 2

INVENTOR.
CLARENCE U. GRAMELSPACHER
BY
ATTORNEYS

United States Patent Office 2,839,118
Patented June 17, 1958

2,839,118

COMBINATION TUBELESS AND SAFETY TUBELESS TIRE

Clarence U. Gramelspacher, Jasper, Ind.

Application December 20, 1952, Serial No. 327,145

5 Claims. (Cl. 152—341)

My present invention relates to pneumatic tires, and particularly to an improved arrangement which is suited for use on automobiles, aircraft, bicycles and similar vehicles.

It is a principal object of this invention to provide a tire construction having the features of a conventional tubeless tire and a safety tubeless tire.

Another object is to describe a structure in which the conventional tubeless tire is modified by the inclusion of a closure member between the tire beads.

A further and a principal object of the invention is to describe an endless diaphragm including means for sealing the same to a conventional tubeless tire.

Accordingly it is within the contemplation of this invention to describe closure members and other means which may be incorporated into a conventional tubeless tire to adapt the same for use, for example, as a safety tubeless tire. Thus, the present tire molds of industry may be utilized to produce the tire carcass required for the embodiments of the present invention; further the inclusion of the closure member and other conversion means do not permanently alter the tire carcass structure and accordingly upon removal the carcass regains its normal capabilities and is useful in the customary way.

These and other objects and advantages will be apparent during the course of the folowing description:

Figure 1:
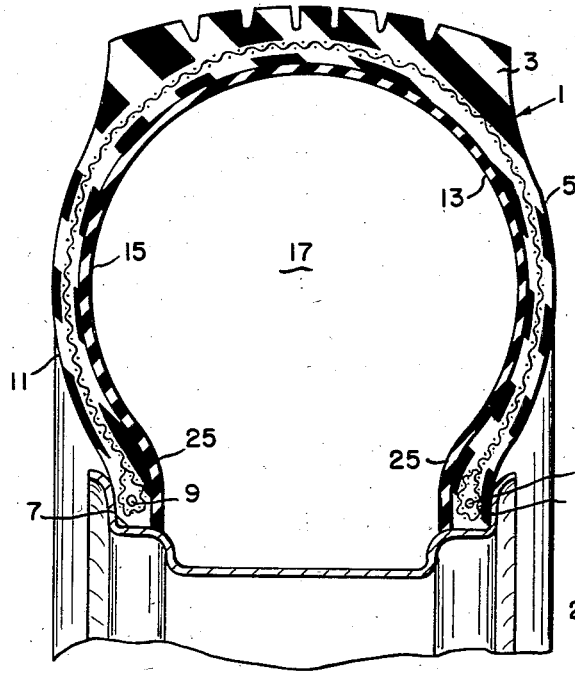
Figure 1 is a cross-sectional view of a conventional tubeless tire.

Referring to the drawings there is shown in Figure 1 a conventional tubeless tire 1 having a carcass comprising a tread 3, sidewalls 5, and bead portions 7 which latter are suitably provided circumferentially with wire reinforcing 9. The outer surface 11 is rubberized and the inner wall 13 is provided with a layer of air-impermeable material 15 such as butyl rubber. Thus an unobstructed chamber 17 is formed in the tire.

The tire illustrated in Figure 1 is producible from the ordinary production moulds of the tire industry and the tire is itself usable in normal tubeless fashion. In such use however the tire would lack safety characteristics. To provide these latter features and convert the tire of Figure 1 to a safety tire a removable diaphragm or a removable combination of a diaphragm and liner is provided, such as that described in my co-pending applications, Serial Nos. 307,439 and 307,440, filed September 2, 1952, now abandoned.

Figure 2:
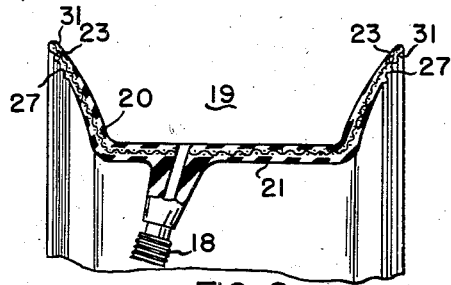
Figure 2 is a view partially in section indicating a closure member for the structure of Figure 1.

Further, the structure of Figure 1 may simply incorporate a liner or closure member 19 as shown in Figure 2.

Referring then to Figure 2 there is shown at 19 a closure member having a toe portion 21 and flare portions 23. Preferably the thickness of the toe 21 is somewhat greater than that of the flares since this construction provides rigidity across the spacing between beads 7 while permitting flexibility and smooth contact of the flares with the beads and bead shoulders 25.

The flare portions are ribbed as at 27 and the ribs may constitute either protuberances from the surface or indentations moulded therein. These ribs as indicated at 27 are coated over rather freely with a soft sticky sealant which insures of an airtight seal between the beads and closure member.

Closure member 19 may if desired be provided with an inner layer or layers 20 of reinforcement such as fabric or wire mesh which serves to increase the rigidity of the member against lateral thrust. This reinforcement preferably terminates, adjacent the tips of the flares, in circumferentially extending wires 31.

Figure 3:
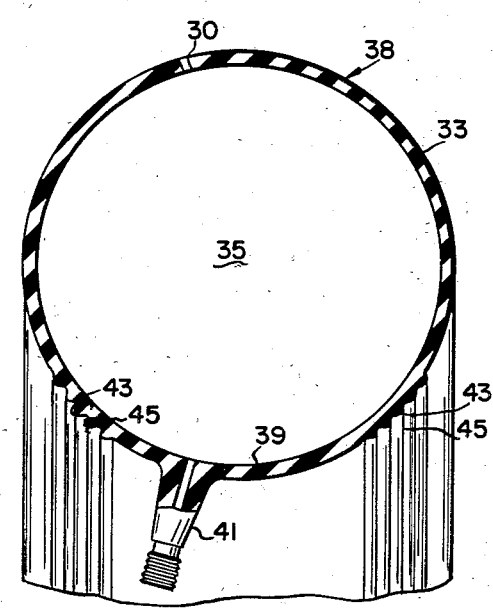
Figure 3 is a cross-sectional view of an endless closure member provided with sealant means.

Figure 3 illustrates a tubular or endless wall type of closure member 38 enclosing a chamber 35 and having a vent 30 and a wall 33 which is adapted to divide the tire (Figure 6) into two chambers. Member 38 is also provided with a relatively heavy toe portion 39 which carries valve stem 41 and from which the sidewalls flare upwardly. Adjacent this toe 39 the walls are ribbed as at 43 and a sealant 45 is spread over the ribbed portion.

Figure 4:
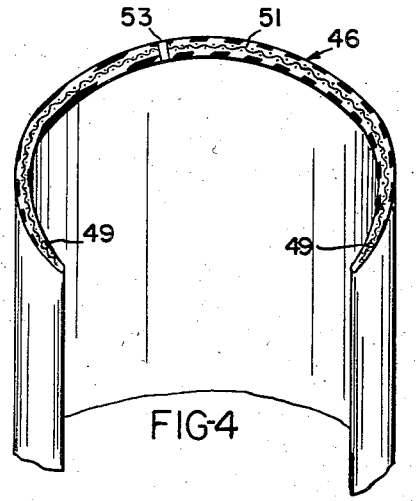
Figure 4 is a cross-sectional view of a diaphragm useful in an embodiment of the invention.
Figure 5:
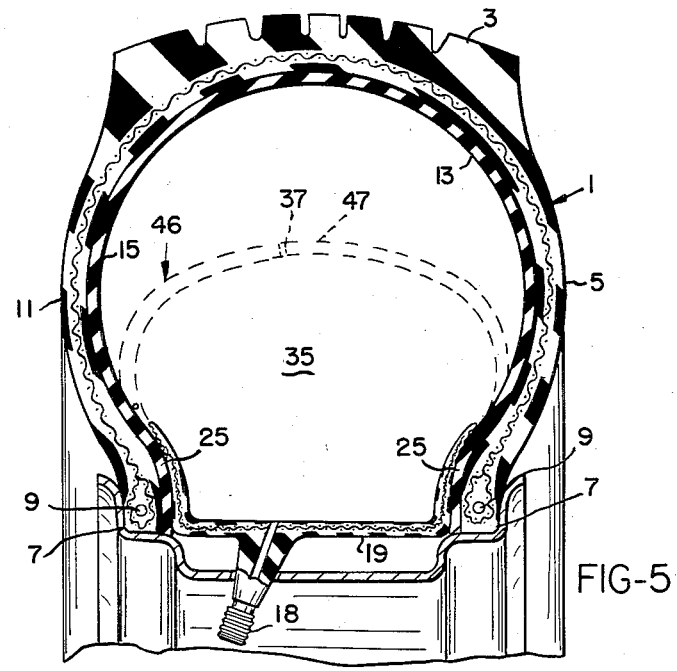
Figure 5 is a cross-sectional view of one embodiment of this invention; and illustrating a tire assembled on a rim, preparatory to inflation.

There is shown in Figure 4 a diaphragm indicated generally at 46 which may be mounted and sealed between the bead portions of a tire as indicated by the dotted line labeled 47 in Figure 5 to give to the tire safety characteristics. The diaphragm similarly to the closure members 19 and 38 may consist of a rubberized fabric or of thin flexible rubber of sufficient strength and imperviousness to prevent passage of air under normal pressure conditions within the tire.

Preferably diaphragm 46 is reinforced by circumferentially extending wires 49 and may if desired include a reinforcement member 51 such as a thin wire mesh having a degree of flexibility such that mounting within a tire (Figure 5) may be readily accomplished. The diaphragm is vented as at 53 and where the structure consists of plies of rubberized fabric enclosing a mesh 51 the vent may be readily formed through the composite by any sharp piercing tool.

Sealant may be provided on the lower sides of the diaphragm in order to insure that an airtight seal may be formed between the tire carcass and the diaphragm.

Referring now to Figure 5 the carcass of tire 1 (Figure 1) is shown as having included therein a closure member 19 (Figure 2) and a diaphragm 46 (Figure 4) as indicated by the dotted lines. The diaphragm 46 however need not be employed unless a safety tubeless tire is desired.

Thus the closure member 19 only may be inserted into the opening between the beads 7 with the flare portions extending upwardly over the shoulders 25. This arrangement permits expansion of the tire through valve 18 and the interior chamber is unobstructed in the inflated condition of the tire. Due to the natural flexibility and contour of the closure member the flares closely engage the inner portions of the carcass at the beads and shoulders, and the air contained therein assists in maintaining an airtight seal as it pressures the flares against the carcass. As noted hereinbefore ribs and sealant may be employed to aid the attainment of the seal if desired.

The diaphragm 46, as shown in dotted lines at Figure 5, when employed alone or with the closure member 19 achieves a safety tire feature since upon puncture of the tire air will leak but slowly from chamber 35 through valve 37 thus occasioning only a slow depression of the tire. The diaphragm mounts over the shoulder of the tire and under the closure member if such is employed. It is to be noted in this latter respect that inflation of the safety tire takes place through a valve on the tire rim if no closure member is employed.

Figure 6:
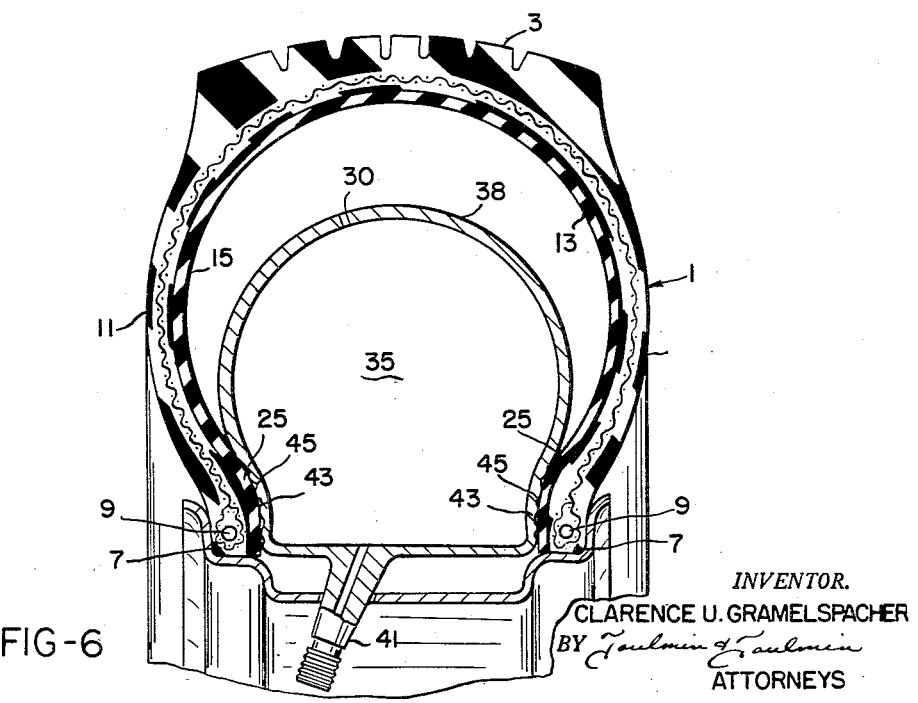
Figure 6 is a cross-sectional view of another embodiment of this invention illustrating a use as a safety tubeless tire, and illustrated as assembled on a rim preparatory for inflation.

Figure 6 illustrates the endless closure member or diaphragm 38 of Figure 3 mounted in a tire; similarly to diaphragm 46 this member 38 provides a safety feature and sealing to the side wall is assisted by the internal pressure in chamber 35 as well as by ribbing 43 and sealant 45.

In each of the cases illustrated in Figures 5 and 6 the inserted member is removable from the tire without detriment thereto. The sealant which may be a viscous glue or a deformable plastic mass need only have such a degree of adherence as to prevent the passage of air between the members and accordingly ready separation of the components on application of a slight stress is achievable.

Further each of the inserts may be constructed so as to compress slightly for insertion into the carcass and to pressure the bead portions and shoulders upon removal of the stress. The subsequent introduction of the air to the tire will of course enhance this latter result and accordingly the structural arrangement also facilitates tire inflation.

There has thus been described in accordance with the stated objective of the invention a conventional tubeless tire which may receive different inserts of a lesser peripheral dimension than the interior sidewall of the tire to accomplish specific desired objectives and yet the normal function for which the tire is designed is not lost upon removal of the inserts.

This application is related to copending applications Serial Nos. 307,439 and 307,440, each filed September 2, 1952, now abandoned.

It will be understood that this invention is susceptible to modification in order to adapt it to different usages and conditions and accordingly, it is desired to comprehend such modifications within this invention as may fall within the scope of the appended claims.

I claim:

1. As an article of manufacture for use in converting a tubeless tire to a safety tubeless tire, a tire casing having a tread portion and side walls forming an air chamber, said casing having an inner liner wall of butyl rubber contiguous with the side walls of the casing and extending beneath the tread portion forming an air-impermeable sealant inner wall, an open-ended insert having flare side wall portions of lesser peripheral dimension than the tire inner side wall of said tire casing for insertion in said tire to provide a diaphragm therefor, an air vent in said diaphragm, said diaphragm consisting of rubberized fabric having an inner reinforcing section of wire cloth, a tubular closure member for positioning in overlapping engagement with said open-ended insert, said tubular closure member carrying a valve stem and valve for admitting fluid pressure to the tire.

2. As an article of manufacture for use in converting a tubeless tire to a safety tubeless tire, a tire casing having a tread portion and side walls forming an air chamber, said casing having an inner liner wall of butyl rubber contiguous with the side walls of the casing and extending beneath the tread portion forming an air-impermeable sealant inner wall, an open-ended insert having flare side wall portion of lesser peripheral dimension than the tire inner side wall of said tire casing for insertion in said tire to provide a diaphragm therefor, said diaphragm being provided with an air vent and a circumferentially extending wire means for reinforcing the same, said diaphragm consisting of rubberized fabric having an inner reinforcing section of wire cloth, a tubular closure member for positioning in overlapping engagement with the end wall portions of said open-ended insert, said tubular closure member carrying a valve stem and valve for admitting fluid pressure to the tire.

3. As an article of manufacture for use in converting a tubeless tire to a safety tubeless tire, a tire casing having a tread portion and side walls forming an air chamber, said casing having an inner liner wall of butyl rubber contiguous with the side walls of the casing and extending beneath the tread portion forming an air-impermeable sealant inner wall, an open-ended insert having flare side wall portions of lesser peripheral dimension than the tire inner side wall of said tire casing for insertion in said tire to provide a diaphragm therefor, an air vent in said diaphragm, said diaphragm consisting of rubberized fabric having an inner reinforcing section of wire cloth, a tubular closure member for positioning in overlapping engagement with said open-ended insert, said closure member having a toe portion for engaging the side walls of the tire and sealing the ends of said diaphragm against the inner walls of said tire.

4. As an article of manufacture for use in converting a tubeless tire to a safety tubeless tire, a tire casing having a tread portion and side walls forming an air chamber, said casing having an inner liner wall of butyl rubber contiguous with the side walls of the casing and extending beneath the tread portion forming an air-impermeable sealant inner wall, an open-ended insert having flare side wall portions of lesser peripheral dimension than the tire inner side wall of said tire casing for insertion in said tire to provide a diaphragm therefor, an air vent in said diaphragm, said diaphragm consisting of rubberized fabric having an inner reinforcing section of wire cloth, a tubular closure member for positioning in overlapping engagement with said open-ended insert, said closure member having a toe portion and ribbed flared portions for sealing said diaphragm open-ended wall portions.

5. As an article of manufacture for use in converting a tubeless tire to a safety tubeless tire, a tire casing having a tread portion and side walls forming an air chamber, said casing having an inner liner wall of butyl rubber contiguous with the side walls of the casing and extending beneath the tread portion forming an air-impermeable sealant inner wall, an open-ended insert having flare side wall portions of lesser peripheral dimensions than the tire inner side wall of said tire casing for insertion in said tire to provide a diaphragm therefor, said diaphragm being provided with circumferentially extending wire means for reinforcing the same, said diaphragm being vented for the passage of air therethrough and comprising a reinforced fabric enclosing mesh, said diaphragm consisting of rubberized fabric having an inner reinforcing section of wire cloth, a tubular closure member for positioning in overlapping engagement with said open-ended insert, said tubular closure member carrying a valve stem and valve for admitting fluid pressure to the tire.

References Cited in the file of this patent

UNITED STATES PATENTS

| | | |
|---|---|---|
| 1,451,304 | Mitchell | Apr. 10, 1923 |
| 1,633,963 | Weigel | June 28, 1927 |
| 1,889,799 | Clark | Dec. 6, 1932 |
| 2,554,815 | Church | May 29, 1951 |
| 2,587,470 | Herzegh | Feb. 26, 1952 |
| 2,674,291 | Campbell | Apr. 6, 1954 |
| 2,674,292 | Sutton | Apr. 6, 1954 |

FOREIGN PATENTS

| | | |
|---|---|---|
| 10,272 | Great Britain | 1898 |

OTHER REFERENCES

Tires Service Station, February 1951, page 36, volume XXXII, No. 7.